Figure 1:
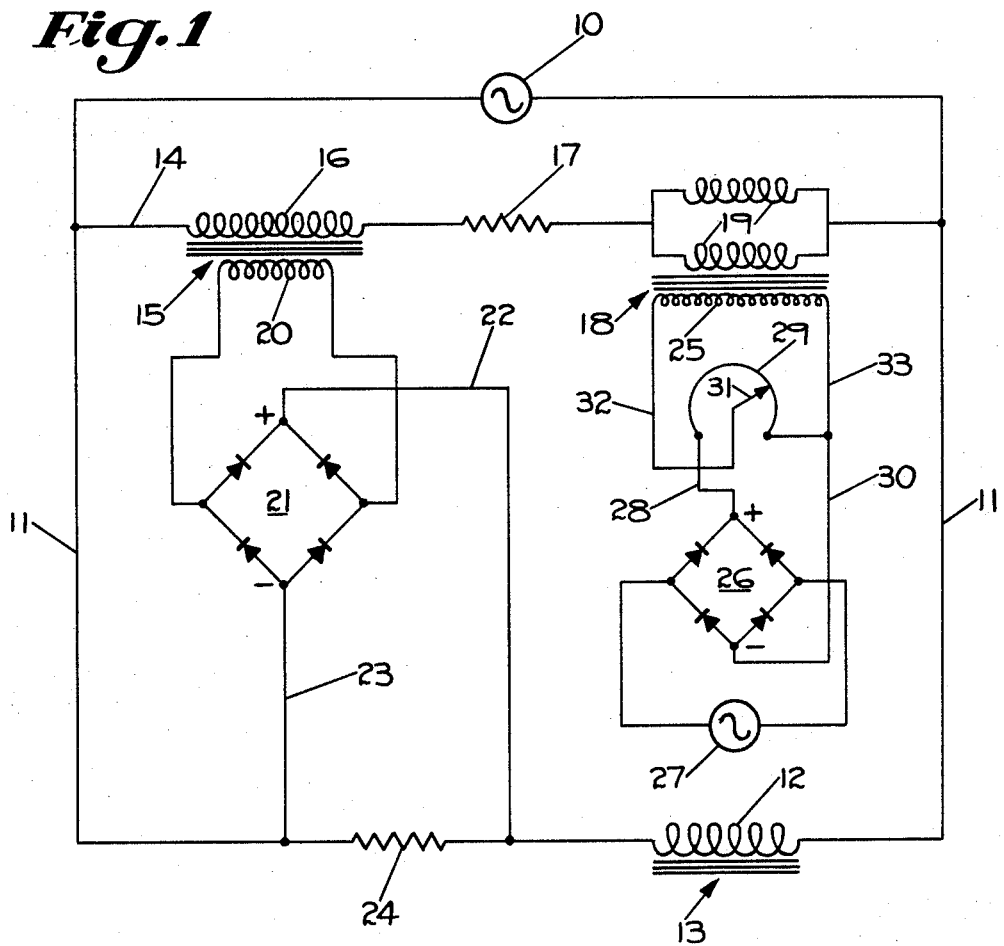

July 21, 1964   MING K. SHIEH   3,142,011
D.C. BIASED VIBRATOR AND CONTROL CIRCUIT
Filed April 16, 1962

INVENTOR;
MING K. SHIEH,
BY David Young
ATT'Y.

3,142,011
D.C. BIASED VIBRATOR AND CONTROL CIRCUIT
Ming K. Shieh, Columbus, Ohio, assignor to Jeffrey Galion Manufacturing Company, a corporation of Ohio
Filed Apr. 16, 1962, Ser. No. 187,470
6 Claims. (Cl. 318—133)

The instant invention is in a control circuit for an electrical vibrator.

Electrical vibrators of the type to which the instant invention has application, include a coil to which there is supplied a mixed current consisting of an alternating current component and a direct current component, by which there is produced a pulsating magnetic field which vibrates an armature, the latter being alternately attracted by the magnetic field and released to produce the desired vibrations. The alternating current supplied to the vibrator coil, acting alone, does not produce vibration, but will merely result in a humming of the vibrator. The imposition of the direct current on the alternating current produces a pulsating magnetic field of sufficient strength and proper frequency for the desired vibration. The pulsating magnetic field, and accordingly, the amplitude of vibration are controlled by control of the magnitude of the direct current imposed on the alternating current.

It is a prime object of the instant invention to provide an improved means for controlling the pulsating magnetic field, and accordingly, the amplitude of vibration in an electrical vibrator, such as that described hereinabove.

It is a further object of the instant invention to achieve the control of the electrical vibrator by the use of a relatively small control current.

It is another object of the instant invention to provide an improved control for an electrical vibrator utilizing a saturable core reactor as the controlling device.

It is also an object of the instant invention to provide a control for an electrical vibrator in which the power requirements for the control are very small.

Still another object of the instant invention is to provide a control for an electrical vibrator in which the control may be conveniently located at a remote position with respect to the vibrator.

Other objects of the instant invention will appear hereinafter, the novel features and combinations being set forth in the appended claims.

Figure 2:
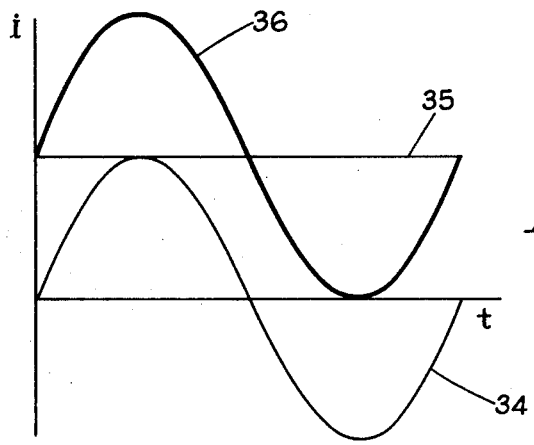

In the drawings:

FIG. 1 illustrates an electrical vibrator control circuit embodying the instant invention; and FIG. 2 illustrates the direct current, alternating current and mixed current curves.

Referring to the drawing, the circuit illustrated therein includes a source of alternating current 10 connected by a line 11 to the coil 12 of the vibrator 13. Alternating current from the source 10 is supplied to the coil 12 through the line 11. However, the alternating current, acting alone, is insufficient to produce vibration of the vibrator 13. The supply of only the alternating current to the coil 12 merely produces a humming of the vibrator 13.

A line 14 is connected across the alternating current source 10. A step-down transformer 15 has its primary winding 16 connected in the line 14. A resistance 17 is also connected in the line 14, for a purpose to be described hereinafter. A saturable core reactor 18 has its load windings 19 also connected in the line 14. The saturable core reactor 18 controls the voltage across the primary winding 16 of the transformer 15 in a manner which will be described in detail hereinafter.

An alternating current voltage is supplied from the alternating current source 10, through the line 14, to the primary winding 16. The alternating current voltage across the primary winding 16 induces an alternating current voltage of reduced magnitude in the secondary winding 20 of the step-down transformer 15. The secondary winding 20 is connected to a full-wave, bridge connected rectifier 21, by which the alternating current supplied by the secondary winding 20 is converted too a direct current. A line 22 is connected to the positive terminal of the full-wave rectifier 21 and to the coil 12 of the vibrator 13, by which the direct current produced by the rectifier 21 is supplied to the coil 12. The circuit to the rectifier 21 is completed by line 23 connecting the line 11 to the negative terminal of the rectifier 21. A resistance 24 is connected in the line 11 between the lines 22, 23, thereby placing the resistance 24 across the rectifier 21. The resistance 24 serves to block the direct current, whereby the direct current from the rectifier 21 will be supplied through the line 22 to the coil 12. The resistance 24 also serves to limit the peak inverse voltage across the rectifier 21, to protect the latter.

Thus, the direct current produced by the rectifier 21 is imposed on the alternating current supplied to the coil 12 through the line 11. The current supplied to the coil 12 will then be a function of the sum of the alternating current and the direct current. Control of the pulsating magnetic field of the coil 12, and accordingly, the amplitude of vibration of the vibrator 13, is achieved by control of the magnitude of the direct current imposed on the alternating current supplied to the coil 12.

The coil 12 is of relatively high impedance and relatively low resistance. Accordingly, the voltage of the direct current from the rectifier 21 may be less than the voltage of the alternating current from the source 10. The transformer 15 is a step-down transformer, with the secondary winding 20 providing a reduced voltage to the rectifier 21. These elements of the circuit are selected so that the magnitude of the direct current supplied by the rectifier 21, and the magnitude of the alternating current supplied by the alternating current source 10 to the coil 12, are approximately the same. Thus, by control of the magnitude of the direct current there is achieved an effective control of the pulsating magnetic field produced by the coil 12, and accordingly, of the amplitude of vibration of the vibrator 13. In FIG. 2 there is a diagrammatic representation of the mixing of the direct current and alternating current, by which the amplitude of vibration of the vibrator 13 is controlled. The alternating current is represented by the curve 34, and the direct current is represented by the curve 35. In the illustrated example, the direct current is of a magnitude equal to the peak value of the alternating current, whereby the imposition of the direct current on the alternating current produces a pulsating direct current, as represented by the curve 36, by which the vibrator 13 is vibrated.

The aforementioned control of the direct current is achieved by controlling the voltage across the primary winding 16 of the step-down transformer 15. The load windings 19 of the saturable core reactor 18 are connected in series with the primary winding 16, and both are connected across the alternating current source 10. The resistance 17 is connected in the line 14 for the purpose of blocking the direct current from the line 14. However, the resistance 17 has a very low impedance, and therefore, the alternating current voltage across the resistance 17 is negligible. Thus, the voltage of the alternating current source 10 is effectively divided between the primary winding 16 and the load windings 19, in accordance with the respective impedances of the primary winding 16 and the load windings 19. The operation of the saturable core reactor 18 is to control the impedance of the load windings 19, to thereby control the magnitude of the voltage across the primary winding 16 of the transformer 15.

Control of the impedance of the load windings 19 of the saturable core reactor 18, and thus the voltage across the load windings 19, is achieved by means of the control winding 25 of the saturable core reactor 18. A full-wave, bridge connected rectifier 26 supplies a direct current input to the control winding 25. An alternating current source 27 is connected to opposite sides of the rectifier 26, and supplies alternating current thereto, which is converted to direct current. The positive terminal of the rectifier 26 is connected by a line 28 to one end terminal of a potentiometer 29, and a line 30 connects the negative terminal of the rectifier 26 to the other end terminal of the potentiometer 29. The slide 31 of the potentiometer 29 is connected by a line 32 to one side of the control winding 25, and the other side of the latter is connected by a line 33 to an end terminal of the potentiometer 29. Thus, the direct current output of the rectifier 26 is delivered to the control winding 25 through the potentiometer 29, by means of which the magnitude of the direct current input to the control winding 25 may be controlled.

In the saturable core reactor 18, as the magnitude of the direct current in the control winding 25 is increased, the flux density increases, and the effect on the load windings 19 is to reduce the impedance thereof, which, of course, reduces the voltage across the load windings 19. A decrease in the magnitude of the direct current supplied to the control winding 25 produces a decrease in the flux density, with the result that the impedance of the load windings 19 is increased, and there is a greater voltage drop across the load windings 19. Since the voltage of the alternating current source 10 is effectively divided between the primary winding 16 and the load windings 19, a reduction or an increase of the voltage across the load windings 19 produces an increase of a reduction, respectively, of the voltage across the primary winding 16 of the transformer 15. The ultimate effect of controlling the magnitude of the voltage across the primary winding 16 is to achieve a control of the magnitude of the direct current supplied by the rectifer 21 to the coil 12 of the vibrator 13, which controls the pulsating magnetic field of the coil 12 and the amplitude of vibration of the vibrator 13.

The control winding 25 of the saturable core reactor 18 requires only a very small current, of the order of milliamperes, for the purpose of achieving control of considerably larger currents. Thus, the alternating current source 27, which supplies the control winding 25 of the saturable core reactor 18, may be a common 110 volt alternating current source, such as is readily available. The potentiometer 29 is not required to carry any substantial loads, and it may be a relatively small element. This avoids the use of electrical control elements carrying extremely large loads and requiring the provision of means for substantial heat dissipation. It is an outstanding advantage of this system that the control for the vibrator may be conveniently located at a remote location with respect to the vibrator, inasmuch as the current requirements for purposes of control are very small, making it feasible to run lines between elements of the circuit over substantial distances, for example, between the potentiometer 29 and the saturable core reactor 18.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A circuit for controlling the input of current to a vibrator coil comprising, a source of alternating current connected to said vibrator coil for producing a pulsating magnetic field, direct current producing means connected to said coil to impose a direct current on the alternating current input to the coil for controlling the current input to the coil, alternating current means connected to and supplying current to the direct current producing means, a saturable core reactor connected to said alternating current means and controlling the magnitude of the current supply to the direct current producing means to thereby control the magnitude of the output of said direct current producing means to control said pulsating magnetic field.

2. A circuit for controlling the input of current to a vibrator coil comprising, a source of alternating current connected to said vibrator coil for producing a pulsating magnetic field, means for converting an alternating current to a direct current, said current converting means being connected to said coil to impose a direct current on the alternating current input to the coil for controlling the current input to the coil, transformer means connected to said current converting means and supplying alternating current to the current converting means, a saturable core reactor connected to said transformer means and controlling the magnitude of the alternating current supplied to the current converting means to thereby control the magnitude of the output of said current converting means to control said pulsating magnetic field.

3. A circuit for controlling the input of current to a vibrator coil comprising, a source of alternating current connected to said vibrator coil for producing a pulsating magnetic field, direct current producing means connected to said coil to impose a direct current on the alternating current input to the coil for controlling the current input to the coil, a transformer having a primary winding connected to said alternating current source and a secondary winding connected to said direct current producing means for supplying current to the latter, a saturable core reactor connected to the primary winding of the transformer and controlling the magnitude of the alternating current supplied to said primary winding to thereby control the magnitude of the alternating current supplied by said secondary winding to the direct current producing means for control of the magnitude of the output of said direct current producing means to control said pulsating magnetic field.

4. A circuit for controlling the input of current to a vibrator coil comprising, a source of alternating current connected to said vibrator coil for producing a pulsating magnetic field, direct current producing means connected to said coil to impose a direct current on the alternating current input to the coil for controlling the current input to the coil, a transformer having a primary winding connected to said alternating current source and a secondary winding connected to said direct current producing means for supplying current to the latter, a saturable core reactor including a load winding connected in series with the primary winding of the transformer and both the primary winding of the transformer and the load winding of the saturable core reactor being connected across said source of alternating current, means for controlling the impedance of the load winding of the saturable core reactor and thereby controlling the voltage across the primary winding of the transformer whereby the voltage of the alternating current supplied to the direct current producing means is controlled, and the magnitude of the output of said direct current producing means being thereby controlled to control said pulsating magnetic field.

5. A circuit for controlling the input of current to a vibrator coil comprising, a source of alternating current connected to said vibrator coil for producing a pulsating magnetic field, direct current producing means connected to said coil to impose a direct current on the alternating current input to the coil for controlling the current input to the coil, alternating current means connected to and supplying current to the direct current producing means, a saturable core reactor connected to said alternating current means for controlling the magnitude of the current supplied to the direct current producing means, said saturable core reactor including a control winding, a source of current connected to the control winding, means for controlling the magnitude of the current supplied to the control winding by which the control of the saturable core reactor on said alternating cuurrent means is effected, and the magnitude of the output of said direct current producing means is controlled to control said pulsating magnetic field.

6. A circuit for controlling the input of current to a vibrator coil comprising, a source of alternating current connected to said vibrator coil for producing a pulsating magnetic field, means for converting an alternating current to a direct current, said current converting means being connected to said coil to impose a direct current on the alternating current input to the coil for controlling the current input to the coil, a transformer having a primary winding and a secondary winding, said secondary winding being connected to said current converting means for supplying an alternating current to the latter, a saturable core reactor including a load winding and a control winding, said load winding being connected in series with the primary winding of said transformer and both the load winding and the primary winding being connected across the source of alternating current, means for supplying a direct current to said control winding of the saturable core reactor, means for controlling the direct current input to the control winding to vary the magnitude thereof whereby the impedance of the load winding is controlled to control the voltage across the primary winding of the transformer, the voltage across the secondary winding of the transformer being controlled in accordance with the voltage across the primary winding of the transformer to control the magnitude of the output of said current converting means to control said pulsating magnetic field.

References Cited in the file of this patent
UNITED STATES PATENTS
3,040,224    Piltz _____ June 19, 1962